US005380381A

United States Patent [19]

Otruba

[11] Patent Number: 5,380,381

[45] Date of Patent: Jan. 10, 1995

[54] LABELING MACHINE WITH VARIABLE SPEED CUTTING HEAD

[75] Inventor: Svatoboj Otruba, Ceres, Calif.

[73] Assignee: B & H Manufacturing Company, Inc., Ceres, Calif.

[21] Appl. No.: 72,234

[22] Filed: Jun. 3, 1993

[51] Int. Cl.$^6$ .......... B32B 31/00

[52] U.S. Cl. .......... 156/64; 156/265; 156/353; 156/354; 156/521

[58] Field of Search .......... 156/64, 753, 514, 265, 156/267, 521, 351, 354

[56] References Cited

U.S. PATENT DOCUMENTS

| | | | |
|---|---|---|---|
| 3,601,587 | 8/1971 | Thiede . | |
| 3,801,408 | 5/1974 | Kuring et al. . | |
| 4,108,710 | 8/1978 | Hoffman . | |
| 4,108,711 | 8/1978 | Hoffman . | |
| 4,181,555 | 1/1980 | Hoffman | 156/353 |
| 4,221,144 | 9/1980 | Diesch et al. . | |
| 4,236,955 | 12/1980 | Prittie | 156/353 |
| 4,264,957 | 4/1981 | Pautzke . | |
| 4,293,774 | 10/1981 | Pongracz . | |
| 4,316,566 | 12/1982 | Arleth et al. . | |
| 4,361,260 | 11/1982 | Hanlan . | |
| 4,519,868 | 5/1985 | Hoffman . | |
| 4,552,608 | 11/1985 | Hoffman . | |
| 4,618,391 | 10/1986 | Torti et al. | 156/353 |
| 4,985,096 | 1/1991 | Bekker-Madsen | 156/64 |
| 5,017,257 | 5/1991 | Murphy | 156/353 |

FOREIGN PATENT DOCUMENTS

| | | |
|---|---|---|
| 009739 | 4/1980 | European Pat. Off. . |
| 011595 | 5/1990 | European Pat. Off. . |
| 011967 | 11/1981 | United Kingdom . |
| 2096795 | 10/1982 | United Kingdom . |

*Primary Examiner*—Michael W. Ball
*Assistant Examiner*—J. Sells
*Attorney, Agent, or Firm*—Flehr, Hohbach, Test, Albritton & Herbert

[57] ABSTRACT

In accordance with the invention, the label feed roller, the cutter drum, and the vacuum drum are each provided with a drive motor and an encoder which encodes the speed and position of each element. The outputs of the encoders are supplied to a computer. The computer provides appropriate control signals for modulating the speeds of the drive motors. In particular, the drive motor for the cutter drum is accelerated prior to transferring a label onto the vacuum drum. Transfer of a label onto the vacuum drum is completed at a constant cutter drum speed corresponding to the speed of the vacuum drum. Thereafter, the drive motor for the cutter drum is decelerated and set to a constant speed corresponding to the speed of the incoming web of labels. A label from the feed roller is preferably cut at the constant speed.

10 Claims, 5 Drawing Sheets

LABELING MACHINE WITH VARIABLE SPEED CUTTING HEAD

This invention generally relates to a labeling machine for applying labels to containers. More particularly, this invention relates to a labeling machine which operates at optimal rotational speeds during label cutting and container application processes.

BACKGROUND OF THE INVENTION

Examples of labeling machines to which this invention is applicable are those described in U.S. Pat. Nos. 3,765,991; 4,108,709; 4,108,710; 4,181,155; 4,500,386 and 4,704,173. In such machines the label material is supplied in the form of a roll; the label material or web is removed continuously from the roll of label material by a label feed, including a drive roller which contacts the web (bearing against a back-up roller); and the speed of the drive roller determines the speed at which the label web is supplied to the machine. The continuously moving web contacts a cutter head or roller which brings the label between a cutter blade on the cutter head and a stationary blade and severs the label. A label is severed when the cutter blade on a cutter head contacts the stationary blade. The severed label is supplied to the vacuum drum which transports the label on its surface, rotating it past a glue applicator which applies glue to the leading or forward end and to the trailing or rearward end of the label. The label is released at a label release station where it contacts a container which is caused to spin, thereby wrapping the label about it. The trailing end of the label may be lapped over the leading end and secured thereto by glue or, in the case of what is called a spot label which does not extend around the entire circumference of the container, both the leading end and the trailing end of the label are secured to the container by means of glue. Other means than glue may be used for adhering the label to the container, for example, the use of a solvent which when applied to the label forms an adhesive in situ.

There are a number of problems associated with prior art labeling machines. Prior art machines do not accurately coordinate the vacuum drum, cutter drum and web label speeds during the label cutting and label transfer processes. In particular, prior art machines fail to optimally coordinate the speed of the cutter drum with the cutting head during the label cutting process. Also, prior art machines fail to optimally coordinate the speed of the cutter drum with the vacuum drum during the label transfer process.

These problems have a number of consequences. If the cutter head contacts the web at an inappropriate speed, the label may be stretched, which causes it to be displaced. Consequently, the label is misapplied to the container. An inappropriate cutter head speed produces a sliding action between the knife and the label immediately before the label is cut. This sliding action dulls the knife of the cutter head.

Similar problems may arise when transferring a severed label from the cutting drum to the vacuum drum. In particular, if the cutting drum and vacuum drum are at different speeds during the transfer of a label, a nonoptimal transfer may occur.

SUMMARY OF THE INVENTION

In accordance with the invention, the label feed roller, the cutter drum, and the vacuum drum are each provided with a drive motor and an encoder which encodes the speed and position of each element. The outputs of the encoders are supplied to a computer. The computer provides appropriate control signals for modulating the speeds of the drive motors. In particular, the drive motor for the cutter drum is accelerated prior to transferring a label onto the vacuum drum. Transfer of a label onto the vacuum drum is completed at a constant cutter drum speed corresponding to the speed of the vacuum drum. Thereafter, the drive motor for the cutter drum is decelerated and set to a constant speed corresponding to the speed of the incoming web of labels. A label from the feed roller is preferably cut at the constant speed that is to be close to speed of the incoming web of the labels for optimal no tension cut.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Figure 1:
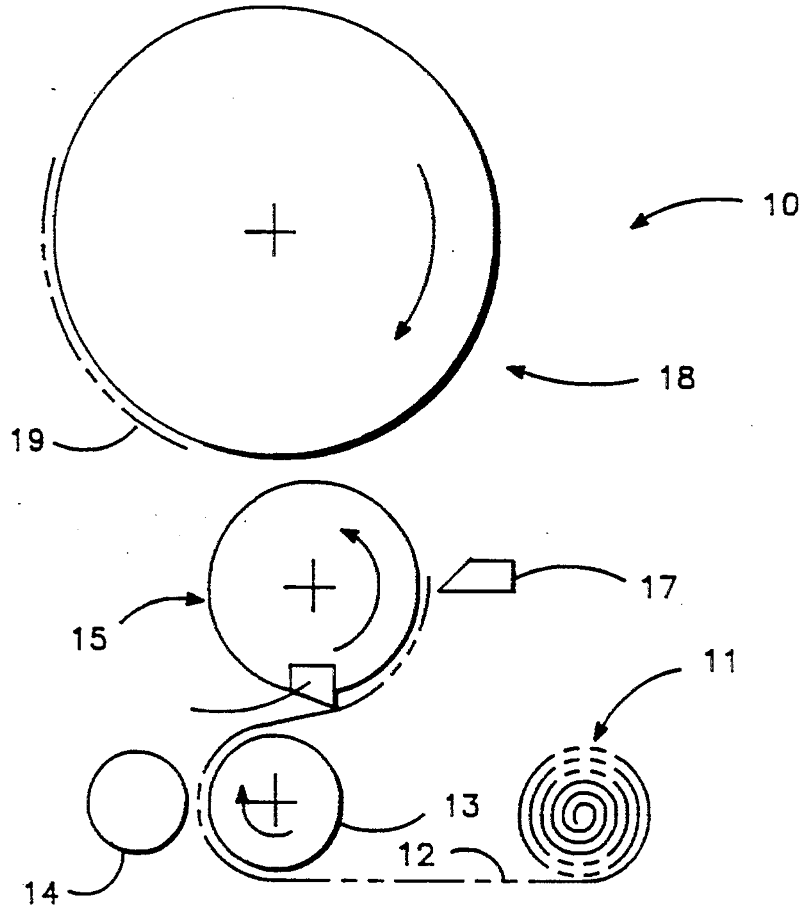
FIG. 1 is a diagrammatic view of elements of a labeling machine including a label feed roller, a cutter head and a vacuum drum, such being shown in a position where a label has been severed, delivered to the vacuum drum and has completely left the cutter head and a new length of label is in progress through the cutting element, but has not yet been severed.

Referring now to the drawings, a roll or web 11 of label material 12 is shown in FIG. 1, the label is shown proceeding through the label drive assembly comprising a back-up roller 13 and a feed roller 14, the label then contacting a cutting drum 15 having a blade 16 which is not yet in contact with the stationary blade 17. There is also shown a vacuum drum 18 on which a severed label 19 is shown. In FIG. 1 the segment of label material 12 which is yet to become a severed label is shown in contact with the cutting drum 15 but has not yet advanced to a position for cutting.

Figure 2:
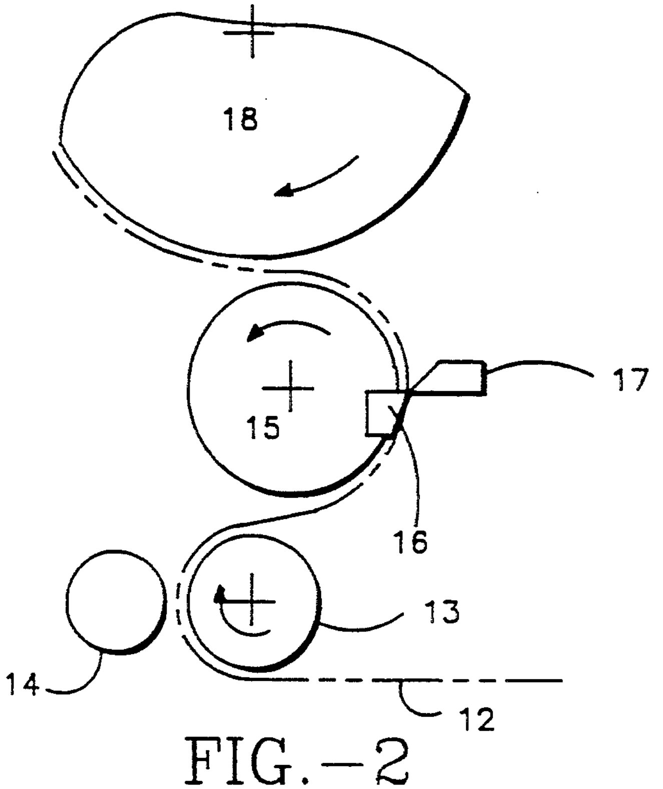
FIG. 2 is a similar view showing the instant of contact of the cutter blade of a rotary cutter head with a stationary blade and in the act of severing a label.

Referring now to FIG. 2, the cutting drum 15 is shown with its cutter blade 16 in the contact with the stationary blade 17 and in the act of severing a label 19 which is shown in the process of being transferred from the cutting drum 15 to the vacuum drum 18.

Figure 3:
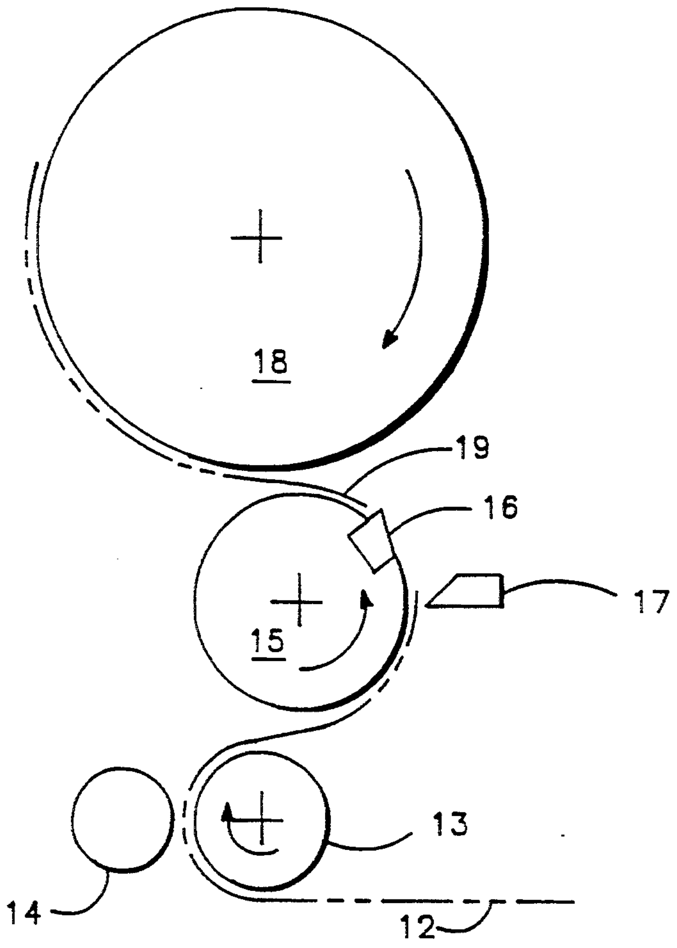
FIG. 3 is a similar view of the machine in which a label has been completely severed and is in the process of transfer to the vacuum drum.

Referring now to FIG. 3 the elements of the machine are shown in advance of their positions shown in FIG. 2 with a severed label 19 partly under control of the cutting drum 15 and partly under control of the vacuum drum 18.

It will be understood that the cutting drum 15 and the vacuum drum 18 are provided with standard vacuum means and with openings in their cylindrical surfaces for the purpose of holding labels such as shown at 19 on their respective surfaces by vacuum.

Figure 4:
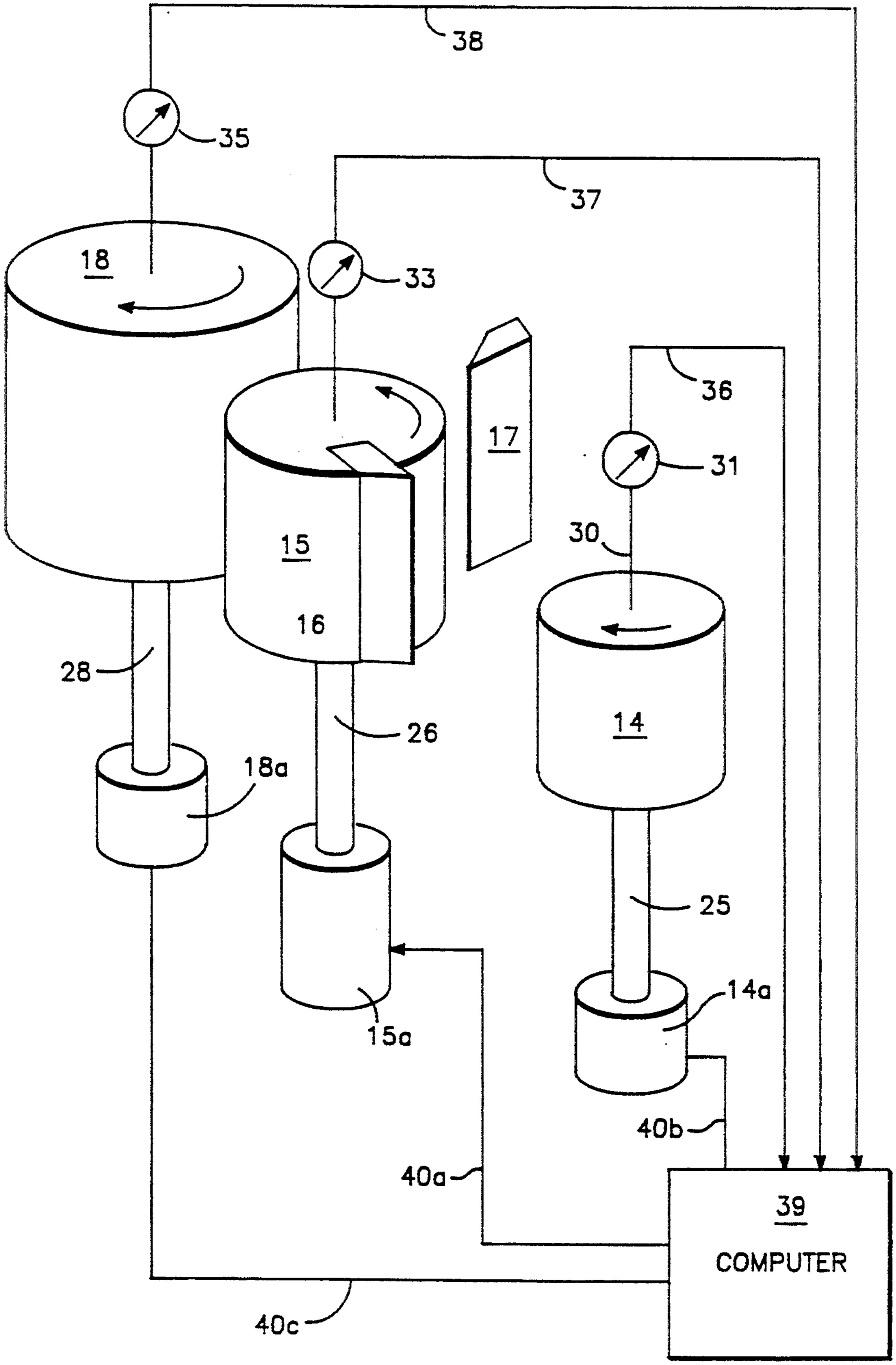
FIG. 4 is a diagrammatic view of the same elements of the labeling machine showing the control circuit including encoders and a computer.

Referring now to FIG. 4, the same elements are shown and are numbered identically as in FIGS. 1, 2, and 3. The label feed roller (label feed drum) 14 is shown mounted on a shaft 25 which is rotated by a servo motor 14A. The cutting drum (rotary cutter drum) 15 is shown mounted on a shaft 26 which is driven by a servo motor 15A. The vacuum drum 18 is shown mounted on a shaft 28 which is driven by a servo motor 18A.

Connected to the label feed roller 14 is an encoder 31; connected to the cutting drum 15 is an encoder 33; and, connected to the vacuum drum 18 is an encoder 35. The encoders 31, 33, 35 are connected respectively by cables 36, 37, 38 to a computer 39 which in turn has output cables indicated by 40A, 40B, 40C to the individual servo motors. The positional encoders used herein are known in the art. Preferably, the encoders provide a digital output value to computer 39. Computer 39 may be any general purpose computer, as will be more fully described below.

The encoders 31, 33, 35 continuously sense the position of each of the respective elements 14, 15, 18 and constantly supply this information to the computer 39. The computer 39 is programmed in a manner to be described below. When a new label length is to be substituted, the computer 39 may be programmed to accommodate the new label length.

Figure 5:
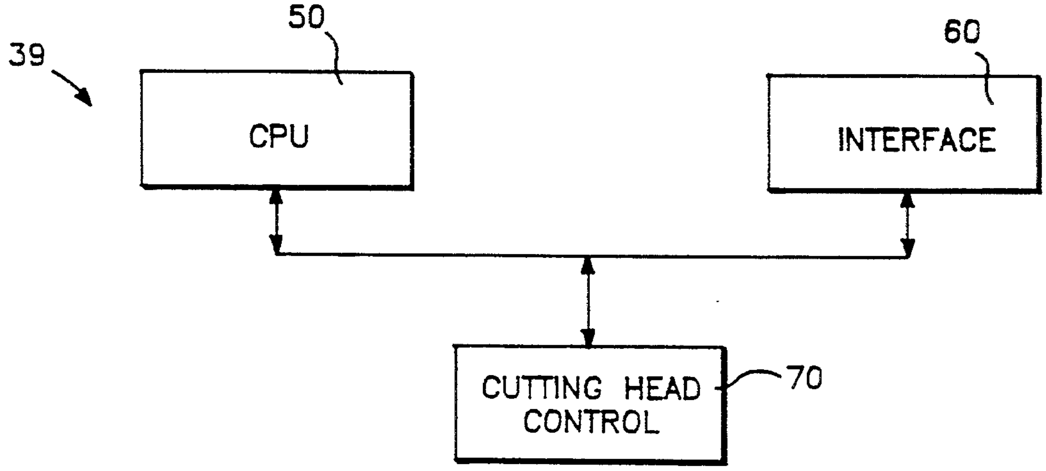
FIG. 5 is a block diagram of a computer which may be used in accordance with the present invention.
Figure 6:
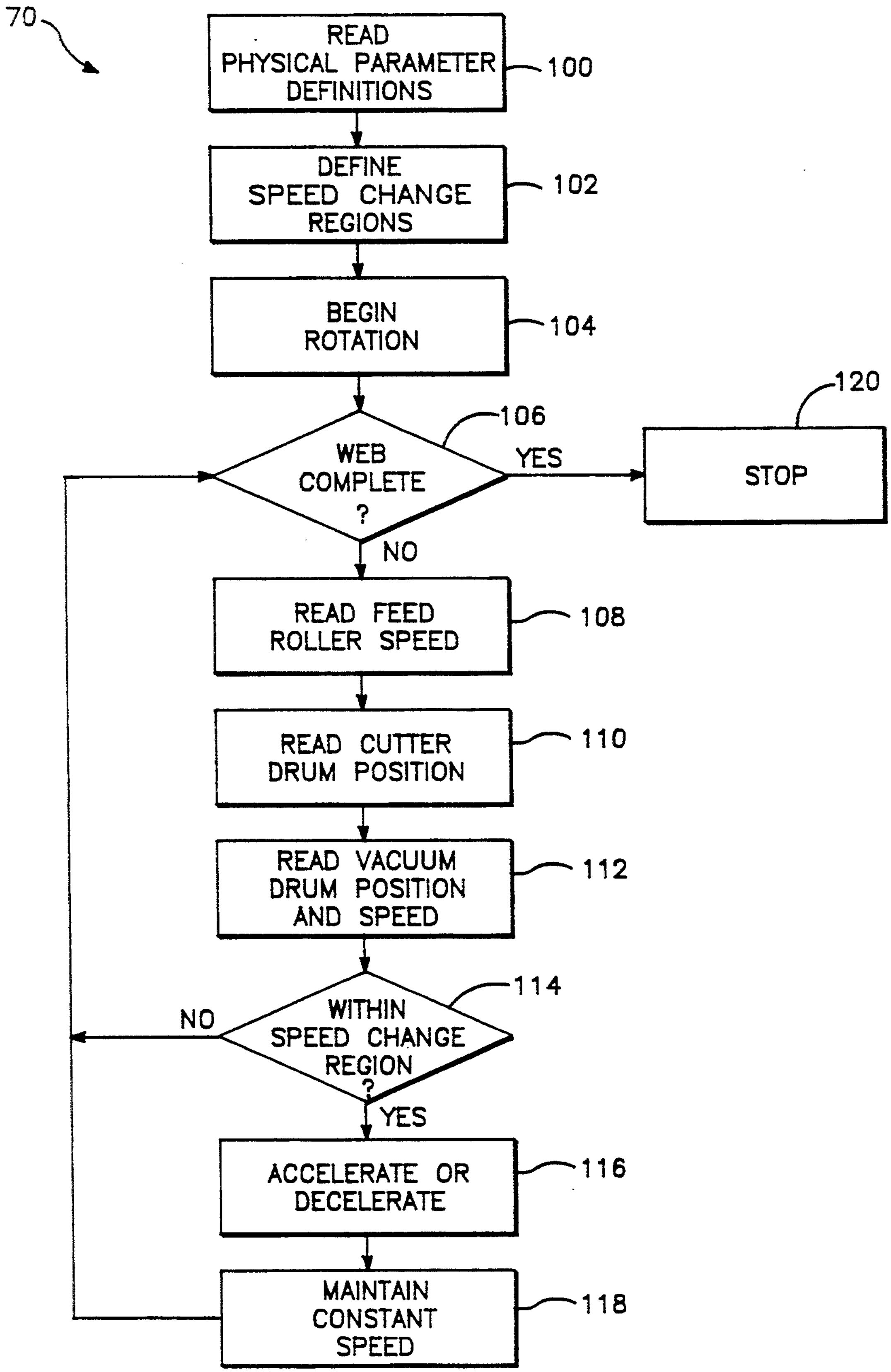
FIG. 6 is a flow diagram of a cutting head control program which may be used in accordance with the present invention.

The operation of the computer 39 is more fully disclosed in relation to FIGS. 5 and 6. FIG. 5 is a simplified depiction of computer 39. Computer 39 includes a central processing unit (CPU) 50 which may be an Intel 80386. The CPU is coupled to an interface board 60 which receives data from the encoders and from other peripheral devices such as a keyboard (not shown); interface board 60 also conveys data to the servo motors and to other peripheral devices such as a computer monitor (not shown). Such interface devices are known in the art. Computer 39 also includes a memory region which stores a cutting head control program 70. The program 70 may be stored in RAM, ROM, or on disc. Interaction between CPU 50, interface board 60 and programs stored in memory are known in the art; however, the particular operation of cutting head control program 70 is more fully disclosed in relation to FIG. 6.

FIG. 6 discloses a flow chart describing a control sequence which may be used in accordance with the present invention. Initially, physical parameter definitions are read (block 100). This information may be provided through a keyboard which is coupled to interface board 60. Examples of applicable physical parameter definitions include: the length of the individual labels, the diameter of the cutter head, the number of knives on the cutter head, the diameter of the vacuum drum, and the number of labels to be applied on the vacuum drum.

Based upon the information provided, speed change regions are defined (block 102). In particular, based upon the physical parameter definitions, standard mathematical relations may be employed to define where and when the label is to be transferred to the vacuum drum and when it is to be cut. That is, by determining where the label is to be transferred to the vacuum drum, the region preceding that location can be defined as a speed change region. In that region, a signal may be sent to servo motors 14A, 15A, 18A to temporarily increase (or decrease) the speed of rotation until a given speed is reached, at which point, a constant speed is maintained, as will be described below.

After speed change regions are defined in one or more locations, rotation of the drums 14, 15, 18 is initiated (block 104) by computer 39 over cables 40A, 40B, 40C. A decision is then made to determine whether the roll of label web 11 is exhausted (decision block 106). Subsequently, the following sequence of steps may be taken until the web 11 is complete.

The computer 39 through interface 60 reads the feed roller encoder 31 information (block 108), the cutter drum encoder 33 information (block 110), and the vacuum drum encoder 35 information (block 112). This positional information may be used to determine whether a given label is within the previously defined speed change region (decision block 114). If a label is within a speed change region, then computer 39 provides a signal through interface 60 to line *40a* to either accelerate or decelerate servo motor 15A (block 116). After the speed change, a constant speed is established (block 118) until another speed change region is encountered.

After establishing a constant speed (block 118) or if a label is not within the speed change region (decision block 114), a decision is once again made to determine whether the web is complete (decision block 106). When the web is complete (all labels having been applied to the containers), the process is stopped.

Figure 7:
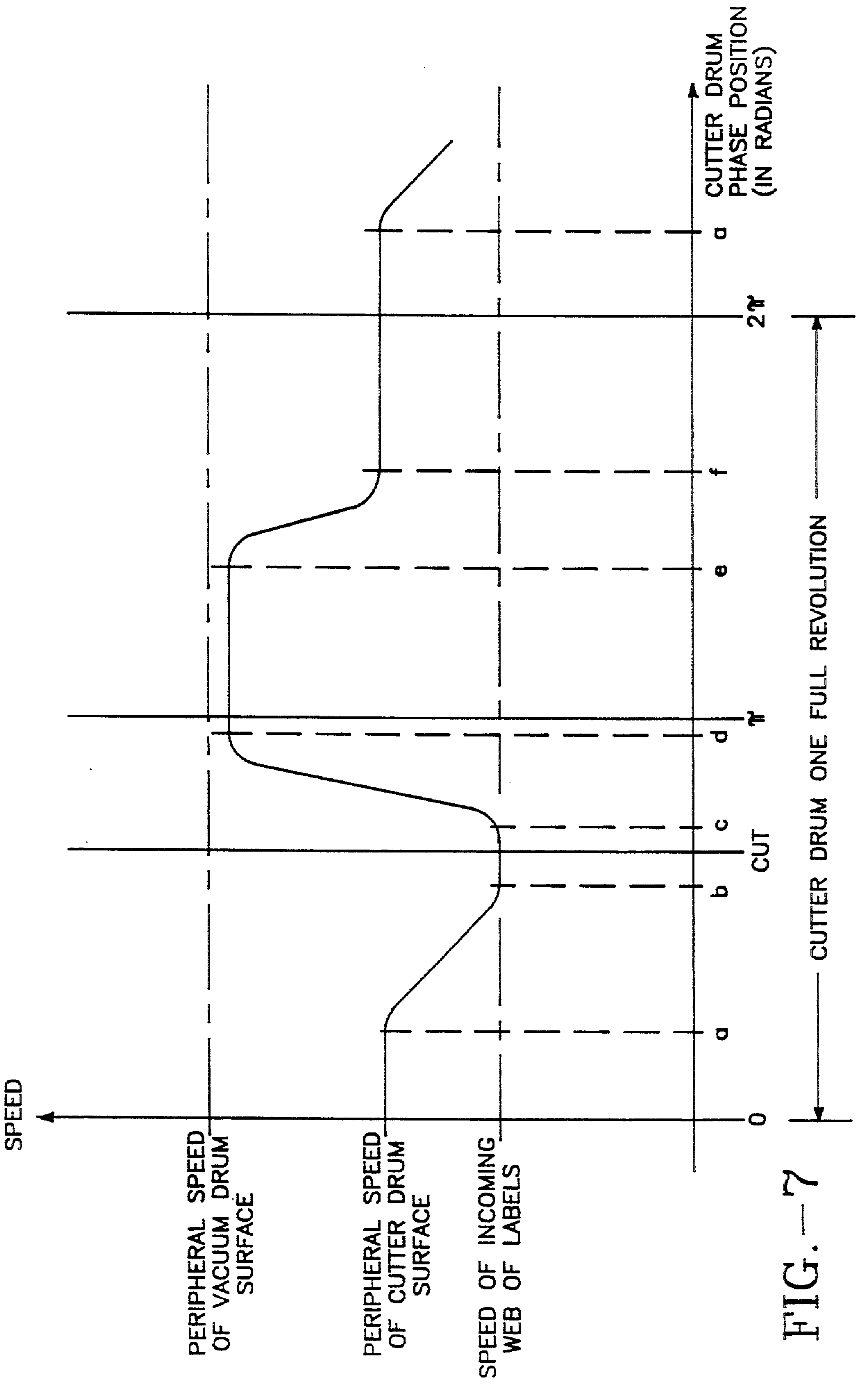
FIG. 7 is a graph depicting possible speed modulation of the cutting drum during one revolution of the drum.

FIG. 7 illustrates one embodiment of the invention wherein only a single label is applied to the cutting drum 15 during one revolution of the drum. The graph of FIG. 7 plots cutting drum 15 surface speed as a function of radians. The figure depicts three speed change regions: between "a" and "b", between "c" and "d", and between "e" and "f". The figure also depicts three constant speed regions: between "b" and "c", between "d" and "e", and between "f" and "a".

In accordance with the invention, the peripheral speed of the cutter drum surface is modulated to match: (1) the peripheral speed of the vacuum drum 18 surface, and (2) the speed of the incoming web of labels. In particular, the peripheral speed of the cutter drum 15 surface is accelerated prior to transferring a severed label onto the vacuum drum 18. The severed label may make contact with the vacuum drum 18 surface while in acceleration or at a constant speed. In either event, the completion of the transfer of the severed label is preferably accomplished at a constant speed. After transferring a label to the vacuum drum, the cutter drum 15 speed is decelerated to match the speed of the incoming labels. At the time of cutting a label, the peripheral speed of the cutter drum surface is equal to the speed of the incoming labels.

This process is more fully appreciated with reference to FIG. 7. There is a speed change region, in this case deceleration region, between "a" and "b" on the cutter drum phase position axis. This region is established to match the speed of the incoming web of labels. A label is cut in the constant speed region between "b" and "c".

In any event, after severing a label in the region between "b" and "c", the cutter drum speed is accelerated between "c" and "d" to match the peripheral speed of the vacuum drum 18 surface. At "d", a constant speed is established and maintained until "e" is reached. The transfer of the severed label from the cutter drum 15 to the vacuum drum 18 occurs at this time. The transfer may transpire at constant speed. In the alternative, the transfer may begin to occur in the speed change region near "d", and be completed in the constant speed region between "d" and "e".

After transferring a label to the vacuum drum 18, another speed change region is invoked, between "e" and "f", to come closer to the speed of the incoming web of labels. The region between "f" and "a" in the figure is depicted as a constant speed region. This region may be substituted with a single deceleration region between "e" and "a". In either event, the processing of a new label begins when reaching "a", as previously described.

When the label is cut at a constant speed corresponding to the speed of the incoming web of labels, cutting of the label is achieved without stretching or displacing the label. Consequently, the cutting knife 16 does not slide along the label and thereby dull the knife. In addition, by matching the speed of the vacuum drum 18 and the cutter drum 15 at the time of label transfer, the severed label can be accurately positioned on the container.

I claim:

1. A method of applying labels to containers, said method comprising the steps of:

providing a feed roller to transport a strip of labels at a first speed;

utilizing a rotating cutter drum to receive said strip of labels from said feed roller, said utilizing step including the step of cutting individual labels of said strip of labels;

operating a vacuum drum at a second speed to receive said strip of labels from said rotating cutter drum; and modulating said rotating cutter drum to accelerate said rotating cutter drum to a speed corresponding to said first speed to receive said strip of labels and to accelerate said rotating cutter drum to a speed corresponding to said second speed to deliver said strip of labels to said vacuum drum.

2. The method of claim 1 further comprising the step of establishing a constant rotational speed of said rotary cutter drum when said label is delivered to said vacuum drum.

3. The method of claim 1 further comprising the step of establishing a constant rotational speed of said rotary cutter drum when said label is cut.

4. An apparatus for applying labels to containers, said apparatus comprising:

a rotating feed roller transporting a strip of labels at a first speed;

a rotating cutter drum to receive said strip of labels from said rotating feed roller, said rotating cutter drum including means for cutting individual labels of said strip of labels;

a rotating vacuum drum operating at a second speed to receive said strip of labels from said rotating cutter drum; and a rotating cutter drum controller to decelerate said rotating cutter drum to a speed corresponding to said first speed to receive said strip of labels and to accelerate said rotating cutter drum to a speed corresponding to said second speed to deliver said strip of labels to said rotating vacuum drum.

5. The apparatus of claim 4 wherein said controller defines a deceleration region to decelerate said rotating cutter drum and an acceleration region to accelerate said rotating cutter drum, said deceleration region and said acceleration region being defined in response to physical parameter definitions.

6. An apparatus for applying labels to containers, said apparatus comprising:

(A) a web of labels including a plurality of wound labels;

(B) a feed roller for receiving said web of labels, said feed roller including (1) a feed roller motor for rotating said feed roller to deliver said web of labels at a first speed, and (2) a feed roller encoder for defining the rotational position and speed of said feed roller;

(C) a cutter drum for receiving said web of labels from said feed roller and cutting individual labels from said web of labels, said cutter drum including (1) means for cutting said individual labels, (2) a cutter drum motor for rotating said cutter drum, and (3) a cutter drum encoder for defining the rotational position of said cutter drum;

(D) a vacuum drum for receiving said individual labels from said rotating cutter drum, said vacuum drum including (1) a vacuum drum motor for rotating said vacuum drum at a second speed, and (2) a vacuum drum encoder for defining the rotational position and speed of said vacuum drum; and (E) a cutter drum controller responsive to said cutter drum encoder and modulating said cutter drum to:

(1) decelerate said cutter drum motor to a speed corresponding to said first speed to receive said strip of labels, and (2) accelerate said rotating cutter drum to a speed corresponding to said second speed to deliver said strip of labels to said vacuum drum.

7. The apparatus of claim 6 wherein said cutter drum controller defines a deceleration region to decelerate said rotating cutter drum and an acceleration region to accelerate said rotating cutter drum, said deceleration region and said acceleration region being defined in response to physical parameter definitions.

8. In a labeling machine comprising a label feed roller driving a continuous strip of labels at a first speed, a cutting assembly including a rotary cutter drum which severs individual labels from said continuous strip of labels, and a rotary vacuum drum operating at a second speed to adhere on its cylindrical surface severed labels from said cutter drum to transport said severed labels to a label applying station for application to containers; the improvement comprising:

means for decelerating the rotational speed of said rotary cutter drum to a speed corresponding to said first speed prior to severing one of said labels; and means for accelerating the rotational speed of said rotary cutter drum to a speed corresponding to said second speed prior to delivering one of the severed labels to said vacuum drum.

9. The improvement of claim 8 further comprising means for establishing a constant rotational speed of said rotary cutter drum when said label is delivered to said vacuum drum.

10. The improvement of claim 8 further comprising means for establishing a constant rotational speed of said rotary cutter drum when said label is cut.

* * * * *